United States Patent [19]
Griffith et al.

[11] 4,225,760
[45] Sep. 30, 1980

[54] PRESSURE ACTUATED UNIT WITH HIGH TEMPERATURE PROTECTION

[75] Inventors: Donald L. Griffith, Northridge; Lawrence A. Dunham, Chatsworth, both of Calif.

[73] Assignee: International Telephone and Telegraph Corporation, New York, N.Y.

[21] Appl. No.: 910,780

[22] Filed: May 30, 1978

[51] Int. Cl.³ .................... F16K 17/38; H01H 35/34; H01H 35/38
[52] U.S. Cl. ................... 200/83 R; 200/83 J; 200/82 C; 137/75
[58] Field of Search ............... 200/83 Q, 83 J, 82 C, 200/82 R, 83 R; 137/67, 72-77

[56] References Cited
U.S. PATENT DOCUMENTS

| 2,736,778 | 2/1956 | Buchanan | 200/82 C |
| 3,245,423 | 4/1966 | Hansen et al. | 137/75 X |
| 3,618,627 | 11/1971 | Wagner | 137/73 |
| 3,659,624 | 5/1972 | Kelly et al. | 137/75 |
| 3,842,853 | 10/1974 | Kelly et al. | 137/75 |
| 3,876,835 | 4/1975 | Wicke | 137/75 |
| 3,876,845 | 4/1975 | Griffith et al. | 200/76 |

Primary Examiner—Martin P. Schwadron
Assistant Examiner—Richard Gerard
Attorney, Agent, or Firm—A. Donald Stolzy

[57] ABSTRACT

A pressure fitting formed of fire resistant material, preferably stainless steel, contains a chamber communicating through an opening with a pressure responsive switch or other assembly formed at least in part of a less fire resistant material, such as aluminum, with a movable seal member being provided for transmitting force to a movable part of the assembly, and with a valve member which is also high temperature resistant being provided to automatically close off fluid flow from the chamber through the opening in the event of fire. The temperature response may be obtained by release of the valve resulting from melting down of part of the pressure responsive assembly, or by melting of a fusible element retaining the valve in open condition, or by both of these effects.

22 Claims, 6 Drawing Figures

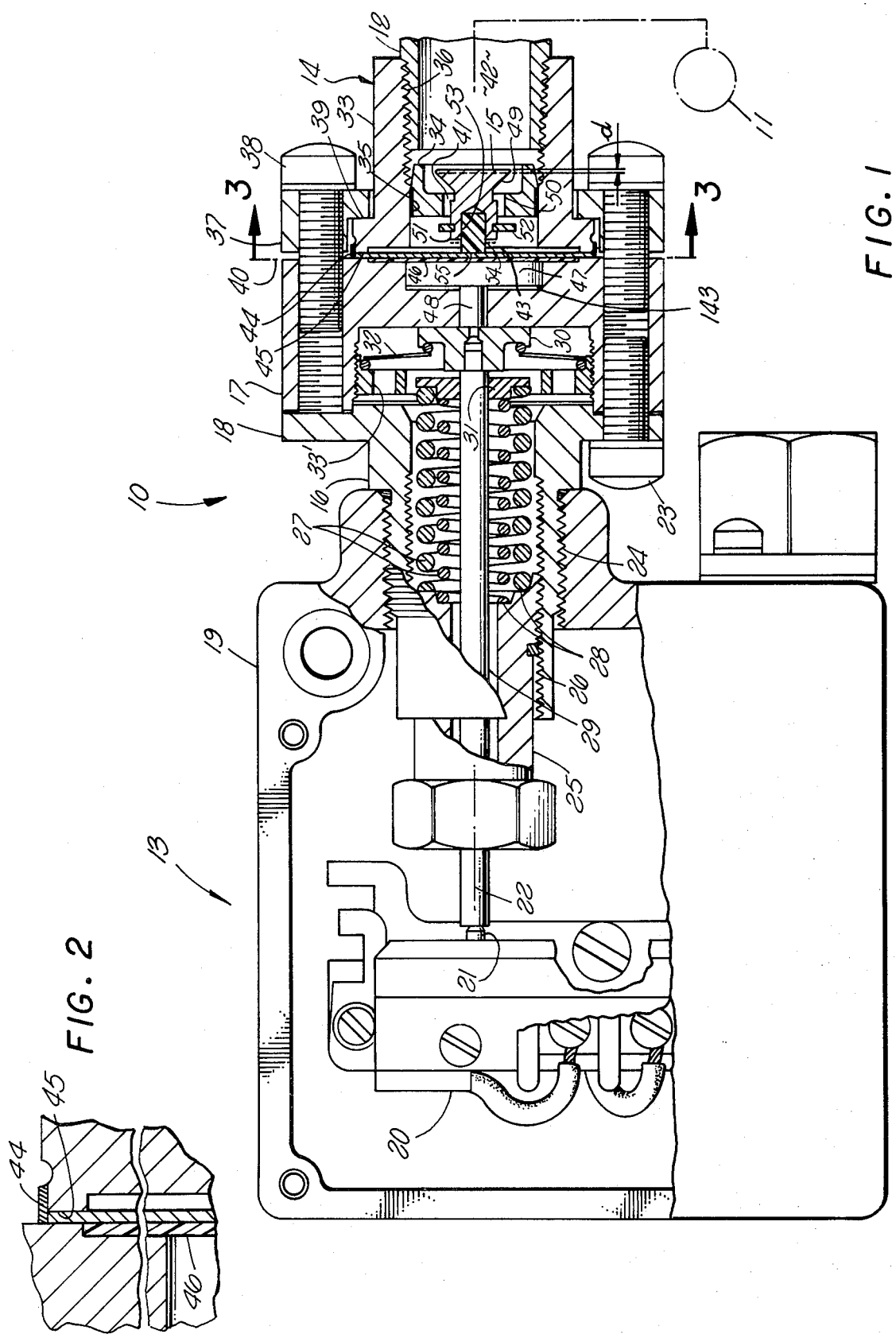

PRESSURE ACTUATED UNIT WITH HIGH TEMPERATURE PROTECTION

BACKGROUND OF THE INVENTION

This invention relates to improved pressure responsive units, such as pressure actuated electrical switches.

In many hydraulic actuating systems, or other fluid handling apparatus, it is necessary or desirable to provide pressure responsive switches and the like at various locations for sensing and automatically responding in a predetermined manner to variations in the fluid pressure. These pressure responsive units are in most instances formed at least in part of a material which cannot effectively withstand the high temperatures encountered in the event of a fire in the vicinity of the equipment. For example, the body of the sensing unit may be formed of aluminum or other relatively low temperature melting material, and may melt completely down in the event of fire in a manner allowing free escape of the pressure fluid from the equipment. Such escape is particularly dangerous where the pressurized fluid is a highly flammable substance, such as gasoline, fuel oil, or the like.

In some instances, attempts have been made to provide fire resistance by forming the pressure responsive unit of high temperature resistant materials, such as stainless steel, or high strength alloys, or by utilizing temperature resistant welded construction or metallic sealing devices. However, most such approaches substantially increase the cost of the equipment, and in many cases impair the sensitivity or overall performance of the component.

The prior art also includes devices in which fusible elements have been employed for rendering a valve automatically closable in response to an increase in temperature, by virtue of melting of the fusible material to release the valve for closing movement. Such devices are shown in U.S. Pat. Nos. 3,245,423, 3,659,624, 3,842,853 and 3,896,835.

SUMMARY OF THE INVENTION

The present invention is directed to the provision of improved pressure responsive switches or other pressure responsive units in which protection against escape of the pressure fluid in the event of fire is attained without the necessity for forming the entire assembly of high temperature resistant parts. Instead, the bulk, of that assembly may be formed in conventional manner of aluminum or other materials incapable of withstanding higher temperatures, with the equipment being adapted to automatically shut off the flow of liquid from the pressure system in the event of or prior to fire induced damage to the pressure actuated unit. These results may be attained without adversely affecting in any way the proper functioning of the pressure actuated unit under normal operating conditions, and without the necessity for any substantial increase in the overall cost of the apparatus.

An arrangement embodying the invention includes a pressure fitting which is connectable to the source of pressure fluid, and which contains a chamber receiving that fluid and an opening leading from that chamber to the exterior of the fitting. A typically substantially conventional pressure actuated switch or other pressure responsive unit is connected to the fitting, and includes a body structure secured to the fitting about the opening, and a pressure actuated part which is mounted movably to the body structure and actuable relative thereto in accordance with variations in force exerted by the pressure fluid through the opening. A movable seal unit is provided through which the force of the pressure fluid is exerted against the pressure actuated part and which prevents leakage of the pressure fluid under normal operating conditions.

The pressure actuated assembly is formed at least in part of a material such as aluminum which is incapable of withstanding high temperatures encountered in a fire situation. The pressure fitting, on the other hand, is formed of a substance such as stainless steel which can withstand higher temperatures, and which will not be substantially damaged in the event of fire. This fitting carries a safety shut off valve which is also formed of such fire resistant material, and which closes automatically in the event of fire to prevent the flow of pressure from the interior of the pressure fitting through the defined opening to the exterior of the device. This valve may be held in open condition by the movable seal unit, and in one form of the invention is released for closing movement as a result of damage to that seal unit in the event of a fire. In another form of the invention, a fusible element is provided for releasing the valve to close by melting of that fusible element. The fusible part may be located between the valve member and the end seal unit, and act to permit movement of the valve member relative to the seal unit even before failure of the latter.

BREIF DESCRIPTION OF THE DRAWINGS

The above and other features and objects of the invention will be better understood from the following detailed description of the typical embodiments illustrated in the accompanying drawings in which:

FIG. 1 is primarily an axial sectional view through a pressure actuated switch arrangement constructed in accordance with the invention;

FIG. 2 is an enlarged detailed view of a portion of the FIG. 1 device;

DESCRIPTION OF THE PREFERRED EMBODIMENTS

Figure 3:
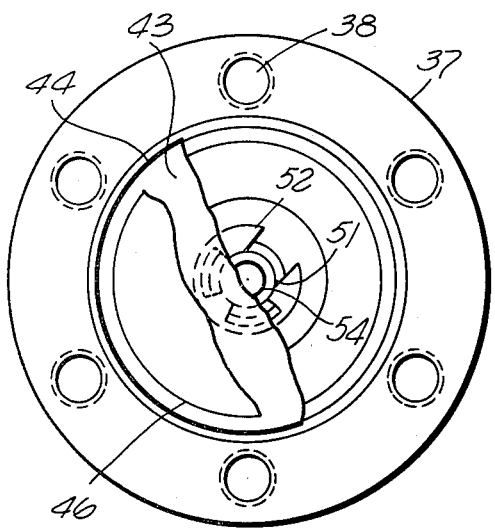
FIG. 3 is a transverse section taken on line 3—3 of FIG. 2, with the diaphragm partially broken away to reveal the valve member and attached parts.

The device 10 illustrated in FIG. 1 is adapted to be connected to a unit which is diagrammatically represented at 11 and may consist of any piece of equipment containing a fluid whose pressure is to be monitored or responded to. For example, the unit 11 may be a hydraulic system containing oil, fuel, gasoline or other typically flammable liquid under pressure. The pressure of this fluid is delivered to the device 10 through a conduit 12, which it is assumed may be formed of stainless steel or other highly fire resistant material.

The device 10 includes a pressure responsive switch 13 of known construction attached to a fire resistant pressure fitting 14 carrying a similarly fire resistant shut off valve 15. Assembly 13 includes a body structure 16 which may be formed sectionally of two annular parts 17 and 18 and a connected housing element 19 containing an electrical switch assembly 20 actuable by movement of a pushbutton 21 along a main axis 22 of the device. The body parts 17, 18 and 19 may all be formed of aluminum or other material which cannot effectively withstand the high temperatures encountered in the event of fire, and which will in many fire situations melt completely down leaving no support for the parts contained within that body structure. The two annular body parts (annular about axis 22) are secured together by a series of bolts 23 spaced circularly about axis 22, and the main housing part 19 is attached to part 18 by threads at 24. A sleeve 25 may be attached threadedly and adjustably to part 18 at 26, to permit adjustment of the force of a pair of compression springs 27 bearing against part 25 at 28. A rod 29 extends along axis 22, and is pressure actuated axially to operate pushbottom 21 of the switch assembly. Rod 29 is attached at its right end to an enlarged head member 30, which is urged rightwardly in FIG. 1 by springs 27 acting against head 30 through a ring or washer 31 disposed about rod 29. An annular "belleville" washer or spring 32 bears in opposite direction against head 30 and a ring 33' carried within part 17, to exert a yielding force having negative spring rate characteristics causing rod 29 to rapidly snap leftwardly for positive actuation of the switch when the rod is moved leftwardly by the pressure fluid to a predetermined position. As will be apparent from the drawing, the entire range of movement of rod 29 is of course very limited, and the switch is of a microswitch type or other construction capable of responding to very little actuating motion.

Pressure fitting 14 may be formed of two sections 33 and 34, both composed of high temperature resistant stainless steel capable of withstanding without damage fire temperatures far in excess of the temperatures which will melt down or otherwise adversely affect the aluminum body parts 17, 18 and 19 of assembly 13, as well as the switch 20 and various other parts of assembly 13. Parts 33 and 34 may both be annular about axis 22, with part 34 being a pressed fit within a bore 35 in part 33 and being in addition nickle brazed or otherwise permanently secured to part 33 in a manner retaining the parts rigidly together under the discussed high temperature fire conditions. Rightwardly beyond part 34, the part 33 may be internally threaded at 36, for connection to the inlet conduit 12. Part 33 may be tightly secured to part 17 by means of a ring 37 secured by circularly spaced screws 38 to part 17 and having a flange 39 bearing leftwardly against and retaining part 33. These various parts meet essentially in a plane 40 disposed transversely of axis 22. Part 34 contains a central opening 41 through which pressure fluid from the main chamber 42 in part 33 may flow leftwardly to exert force against a diaphragm 43 disposed transversely of axis 22 and annularly welded at 44 to a transverse annular face 45 of part 33. The weld at that location is such as to form a continuous circular seal between the diaphragm 43 and part 33, positively preventing under normal operating circumstances the leakage of any fluid from the pressure fitting assembly 14. Preferably, diaphragm 43 is formed of stainless steel in order to avoid deterioration in use. The fluid pressure exerted against the right side of the diaphragm tends to actuate it leftwardly and exert force through a circular flexible back up pad 46 against a circular part 47 having a smaller diameter projection 48 which bears against part 30 to actuate rod 29 leftwardly in FIG. 1 against the resistance offered by springs 27 and 32. The pad 46 serves merely to distribute the force of the diaphragm 43 more uniformly to prevent damage to the diaphragm which might occur if the diaphragm were to directly contact part 17 or part 47.

The safety shut off valve 15 is annular about axis 22 and formed of the same stainless steel material as parts 33 and 34, and has an annular valve surface 49 engageable against an annular valve seat surface 50 formed in part 34 to close off leftward flow of fluid through opening 41 when the valve is in engagement with the seat. A stem 51 of the valve projects leftwardly through opening 41, and externally carries a retaining snap ring 52 which is engageable with the left side of part 34 to hold the valve against complete separation from part 34. At its left side, the valve contains a cylindrical recess or bore 53 centered about axis 22 and within which a cylindrical plug 54 of an appropriate fusible material is contained. This plug like most of the other parts is centered about axis 22 and has an end surface 55 disposed transversely of that axis and engageable leftwardly against the center of diaphragm 43. The diaphragm thus normally acts through plug 54 to hold valve 15 in its open condition, in which fluid can flow freely in either direction past the valve and through opening 41. The valve is thus held by the diaphragm against movement to closed position throughout the entire very limited normal range of movement of the diaphragm and rod 29. That entire range of movement is less than the axial dimension of the narrow gap 143 in FIG. 1. Plug 54 may be formed of any fusible material which in the event of fire will melt before structural damage has been done to body 16 or the other parts of assembly 13 by the fire. For example, plug 54 may be formed of polyethylene or the like, typically adapted to melt at a temperature of about 275 degrees Fahrenheit, while the aluminum body parts and other parts of assembly 13 may be capable of withstanding temperatures up to about 1150 degrees Fahrenheit before the aluminum melts or other structural damage occurs, and the stainless steel units 14 and 15 may be capable of withstanding without structural damage much higher temperatures in excess of 2000 degrees Fahrenheit.

Describing the operation of the device of FIGS. 1, 2 and 3, assume that unit 11 is in operation and is supplying pressure fluid to pressure fitting 14, but that the pressure has not as yet reached a value for actuation of switch 20. The diaphragm 43 and valve 15 are then in their rightward position shown in FIG. 1, and the springs 27 and 32 retain rod 29 in its rightward position to enable the pushbutton 21 of the switch to move to a predetermined open or closed condition. As the pressure within chamber 42 of fitting 14 increases, this pressure is communicated to the right side of diaphragm 43 and acts to urge rod 29 leftwardly, ultimately to a position actuating the switch to its opposite setting. The stainless steel of diaphragm 43 is sufficiently thin to enable enough flexibility to permit this leftward movement of the diaphragm. In the event of fire, when the ambient temperature reaches the melting point of plug 54, that plug fuses and thus releases valve 15 for leftward movement relative to part 34 and the diaphragm. The spacing between the left end surface of valve 15 and the diaphragm is great enough to permit the valve to move leftwardly into closed engagement with seat surface 50 while the valve still remains out of contact with the diaphragm. That is, the diaphragm does not prevent such closing movement of the valve. However, until the diaphragm ruptures and there is some tendency for a substantial amount of fluid flow past the valve, the valve may remain in its open position.

When the temperature reaches a further elevated value at which the body parts 17, 18 and 19 of assembly 13 melt, the resistance offered by part 17 and springs 27 and 32 to the leftward movement of the diaphragm is lost, and the pressure of the fluid may then rupture the diaphragm and initiate sufficient fluid flow leftwardly through opening 41 to positively close valve 15. Thereafter, the valve is retained closed by the pressure within chamber 42 of fitting 14, to seal off the fluid within that chamber by the high temperature resistant parts 33, 34 and 15, and thus maintain a sealed system in spite of the damage to the fire susceptible assembly 13. If the fluid is of a flammable character, this will prevent spreading of the fire by escape of the flammable material.

Figure 4:
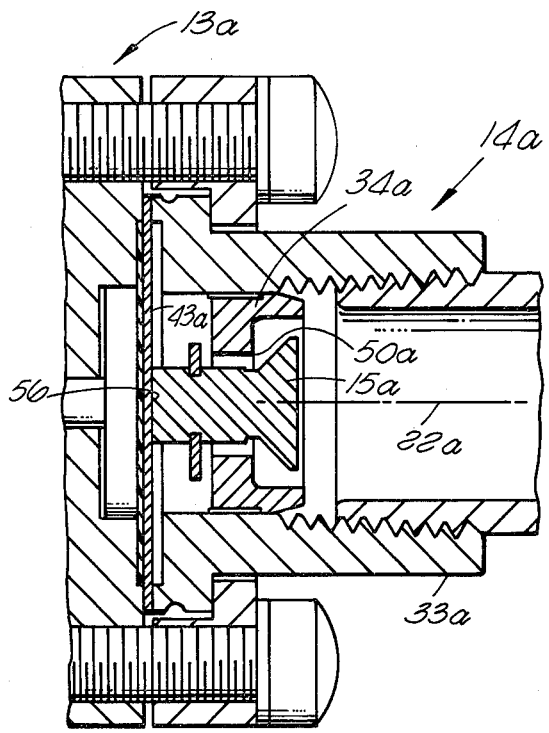
FIGS. 4, 5 and 6 are views similar to a portion of FIG. 1, and showing three variational arrangements.

FIG. 4 shows a variational arrangement which may be identical with that shown in FIGS. 1 to 3 except that the fusible plug 54 has been omitted, and the valve member 15a (corresponding to valve 15 of FIG. 1) has been extended leftwardly to have an end surface 56 disposed transversely of axis 22a and engageable directly against the center of diaphragm 43a. The valve 15a is restrained by the diaphragm against movement leftwardly to closed position, and though the limiting position determined by the diaphragm shifts slightly as the very limited axial movement of the diaphragm actuates the switch assembly in the manner discussed in connection with the first form of the invention, that permitted movement of the valve 15a, under normal operation of the switch assembly, is not sufficient to bring valve 15a into engagement with seat surface 50a. As in the first form of the invention the valve remains open in all normal operating positions of the diaphragm. The switch assembly per se may be identical with that illustrated at 13 in FIG. 1, and may be constructed of aluminum or other relatively low temperature material as discussed, while the valve 15a and parts 33a and 34a of pressure fitting 14a may be formed of high temperature resistant stainless steel also as previously discussed. When the body parts of the switch assembly 13a (corresponding to assembly 13 of FIG. 1) melt away, this releases diaphragm 43a for rupture under the force of the pressure fluid, which then in turn releases valve 15a for closure as the pressure fluid attempts to flow leftwardly therepast.

Figure 5:
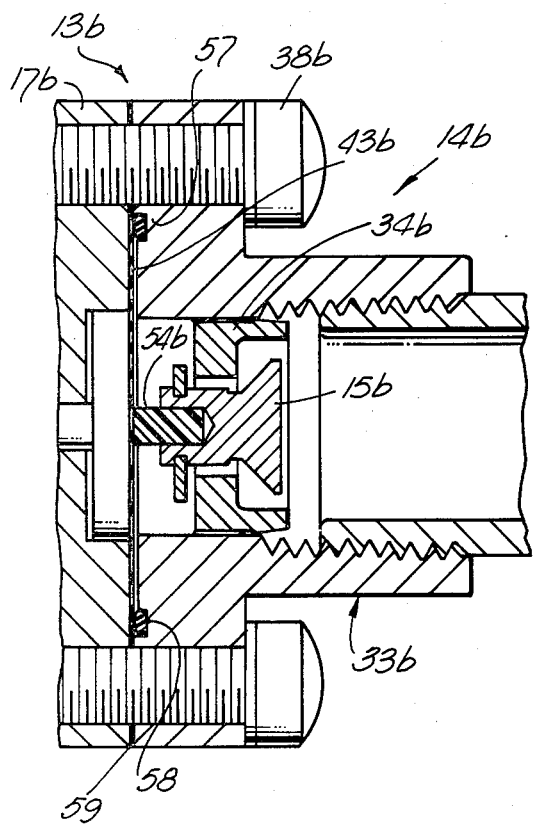

The further variational arrangement shown in FIG. 5 may again include a switch assembly partially represented at 13b and corresponding to assembly 13 of FIG. 1. The pressure fitting 14b includes annular parts 33b and 34b containing a valve 15b carrying a fusible plug 54b of polyethylene or other low temperature melting material. The flexible diaphragm 43b in this instance is not welded to the pressure fitting, but rather is sealed by an annular O-ring 57, which may be contained within a groove 58 formed in part 33b to annularly engage the diaphragm and part 33b in sealing relation when part 33b is tightened against part 17b by screws 38b. The diaphragm 43b may extend radially outwardly past the screws to a location 59, and contain spaced apertures through which the screws extend. Diaphragm 43b may typically be formed of a suitable resinous plastic material, such as an appropriate polyimide. The parts 33b, 34b and 15b are again formed of stainless steel capable of withstanding extremely high temperatures encountered under fire conditions, while the body parts and various other parts of assembly 13b may be formed of aluminum or other lower melting materials.

As in the first form of the invention, engagement of plug 54b with the diaphragm acts to hold the valve 15b open during the entire range of movement of the diaphragm in actuating the electrical switch 20b corresponding to switch 20 of FIG. 1. When there is a fire and the temperature reaches a value high enough to melt plug 54b, fusion of that plug releases valve 15b for leftward movement in a closing direction. When a somewhat higher temperature sufficient to melt part 17b or others of the parts of the switch assembly 13b is attained, the backing for diaphragm 43b is lost and the pressure within part 33b acts to rupture the diaphragm resulting in closure of valve 15b by the fluid tending to flow leftwardly therepast.

Figure 6:
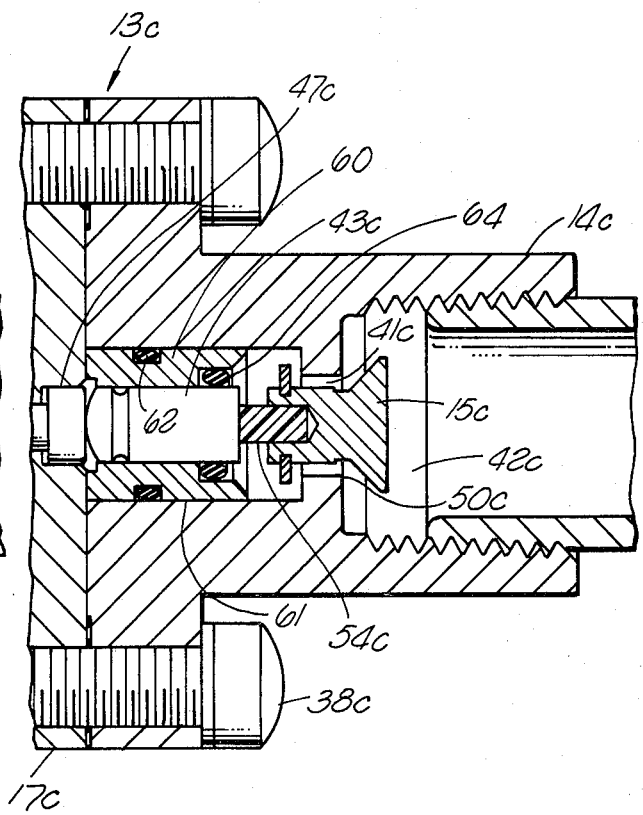

The form of the invention shown in FIG. 6 includes a fragmentarily illustrated switch assembly 13c which may be identical with the assembly 13 of FIG. 1 except that the disc 47c for transmitting force leftwardly to the switch actuating rod may be of a somewhat smaller diameter for actuation by a piston element 43c rather than the diaphragm 43 of FIG. 1. This piston element is contained within an annular cylinder part 60, which is a close fit within a cylindrical bore 61 in a stainless steel pressure fitting part 14c. An O-ring 62 forms an annular seal between cylinder 60 and part 14c, while additional rings 63 and 64 form seals between the cylinder and the piston. The valve member 15c may be the same as the valve 15 of FIG. 1, and may have a low temperature melting plug 54c corresponding to plug 54 of FIG. 1. The pressure within chamber 42c in part 14c is communicated through opening 41c to piston 43c, to actuate it leftwardly through a very limited range of movement corresponding to that of the diaphragm 43 of FIG. 1, for actuating the switch of assembly 13c. This limited range of movement afforded valve 15c and the piston during normal operation of the device is, as in the other forms of the invention, insufficient to close the valve or in any way interfere with free communication between chamber 42c and the piston. Part 14c may be secured to body part 17c of the valve assembly 13c by circularly spaced screws 38c.

In operation of this FIG. 6 form of the invention, the piston 43c serves as a seal element for preventing escape of pressure fluid from the interior of part 14c, while transmitting switch actuating motion to assembly 13c. When a temperature high enough to melt plug 54c is attained, that plug fuses and allows the valve 15c to move leftwardly far enough to engage its seat 50c. However, actual movement of the valve into engagement with its seat may not occur until a higher temperature great enough to melt part 17c is attained, thereby permitting the piston and cylinder to be expelled from bore 61, with commencement of some flow leftwardly past the valve acting to close the valve and thereafter maintain it closed. The stainless steel character of parts 14c and 15c maintain the integrity of the enclosed fluid system to the right of valve 15c even though assembly 13c may be completely destroyed.

While certain specific embodiments of the present invention have been disclosed as typical, the invention is of course not limited to these particular forms, but rather is applicable broadly to all such variations as fall within the scope of the appended claims.

We claim:
1. The combination comprising:
  a pressure fitting containing a chamber within which a pressurized fluid is received and having an opening leading from said chamber to the exterior of the fitting;
  a pressure responsive assembly formed at least in part of material susceptible to damage by high temperatures encountered under fire conditions, said as- sembly including a body structure attached to said fitting about said opening, and a pressure actuated part mounted movably to said body structure and actuable relative thereto in accordance with variations in force exerted by said pressure fluid through said opening;

a movable seal unit through which the force of the pressure fluid is exerted against said pressure actuated part and acting to prevent leakage of fluid from said fitting;

said fitting being formed of material capable of withstanding high temperatures which would damage said pressure responsive assembly and destroy the integrity of said seal unit; and a valve member which responds to destruction and/or deformation of the integrity of the material making up said part of said pressure responsive assembly due to high temperature, said valve member being capable of withstanding said temperatures high enough to damage said pressure responsive assembly to destroy the integrity of said seal unit and automatically responding to an increase in temperature to close said opening against loss of fluid therethrough from said chamber.

2. The combination as recited in claim 1, including a fusible element retaining said valve member in open condition and adapted by melting to release said valve member for closure in response to an increase in temperature.

3. A combination as recited in claim 1, in which said fitting forms an annular valve seat facing inwardly toward said chamber and adapted to withstand said high temperatures and with which said valve member is engageable in closed position.

4. The combination as recited in claim 1, in which said pressure fitting and said valve member are formed of stainless steel.

5. The combination as recited in claim 1, in which said pressure fitting and said valve member are formed of stainless steel, and said pressure responsive assembly is formed at least in part of aluminum.

6. The combination as recited in claim 1, in which said pressure responsive assembly includes electrical switch means actuable by movement of said pressure actuated part.

7. The combination comprising:

a pressure fitting containing a chamber within which a pressurized fluid is received and having an opening leading from said chamber to the exterior of the fitting;

a pressure responsive assembly formed at least in part of material susceptible to damage by high temperatures encountered under fire conditions, said assembly including a body structure attached to said fitting about said opening, and a pressure actuated part mounted movably to said body structure and actuable relative thereto in accordance with variations in force exerted by said pressure fluid through said opening;

a movable seal unit through which the force of the pressure fluid is exerted against said pressure actuated part and acting to prevent leakage of fluid from said fitting;

said fitting being formed of material capable of withstanding high temperatures which would damage said pressure responsive assembly and destroy the integrity of said seal unit; and a valve-member which responds to destruction and/or deformation of the integrity of the material making up said part of said pressure responsive assembly due to high temperature, said valve member being capable of withstanding said temperatures high enough to damage said pressure responsive assembly and to destroy the integrity of said seal unit and which is held open by said seal unit, but which automatically responds to an increase in temperature to close the opening against loss of fluid therethrough from said chamber.

8. The combination as recited in claim 7, including a fusible element interposed operatively between said valve member and said seal unit and operable by melting upon said increase in temperature to release the valve member for closing movement.

9. The combination as recited in claim 7, in which said pressure responsive assembly includes electrical switch means actuable by movement of said pressure actuated part.

10. The combination as recited in claim 7, in which said pressure responsive assembly includes spring means yieldingly resisting movement of said seal unit in the direction of closing movement of said valve member.

11. The combination as recited in claim 7, in which said pressure fitting and said valve member are formed of stainless steel.

12. The combination as recited in claim 7, in which said body of the pressure responsive assembly is formed at least in part of aluminum.

13. The combination as recited in claim 7, in which said seal unit is a flexible diaphragm movable by the pressure of said fluid and sealed peripherally to said fitting about said opening.

14. The combination as recited in claim 7, in which said seal unit is a flexible diaphragm of stainless steel bonded to said pressure fitting about said opening.

15. The combination as recited in claim 7, in which said seal unit includes a flexible diaphragm clamped between said fitting and said body of the pressure responsive assembly about said opening, there being an annular elastomeric seal ring forming a seal between said diaphragm and said fitting about said opening.

16. The combination as recited in claim 7, in which said seal unit includes a piston slidably movable relative to said fitting and sealed with respect thereto.

17. The combination as recited in claim 7, in which said valve member contains a recess facing toward said seal unit, and there being a fusible plug received partially within said recess and projecting beyond said valve member and acting against said seal unit to hold the valve member in open condition, said fusible plug being operable by melting upon an increase in temperature to release the valve member for closing movement.

18. The combination as recited in claim 17, in which said seal unit is a piston movable axially relative to said pressure fitting and acting against said plug to hold the valve member in open condition.

19. The combination as recited in claim 17, in which said seal unit is a flexible diaphragm sealed to said pressure fitting about said opening and acting against said plug to hold said valve member in open condition.

20. The combination as recited in claim 7, in which said pressure fitting and said valve member are formed of stainless steel, and said body of said pressure responsive unit is formed of aluminum; said pressure responsive assembly including electrical switch means operable by said pressure actuated part, and including spring means yieldingly resisting movement of said seal unit and valve member in the direction of closing movement of the valve member; said fitting and said body of the pressure responsive assembly having flanges clamped together about said opening; said seal unit being a flexible diaphragm sealed to said fitting about said opening.

21. The combination as recited in claim 20, including a fusible element carried by said valve member and projecting therefrom toward said diaphragm and acting by melting upon increase in temperature to release the valve member for closing movement.

22. The combination as recited in claim 7, in which said valve member is released by said seal unit for closing movement upon damage to said assembly by fire.

* * * * *